(No Model.) 2 Sheets—Sheet 1.
W. B. MASON, E. J. WESCOTT & W. L. STEVENS.
APPARATUS FOR INDICATING THE SPEED OF SHAFTING, MACHINERY, &c.
No. 334,960. Patented Jan. 26, 1886.
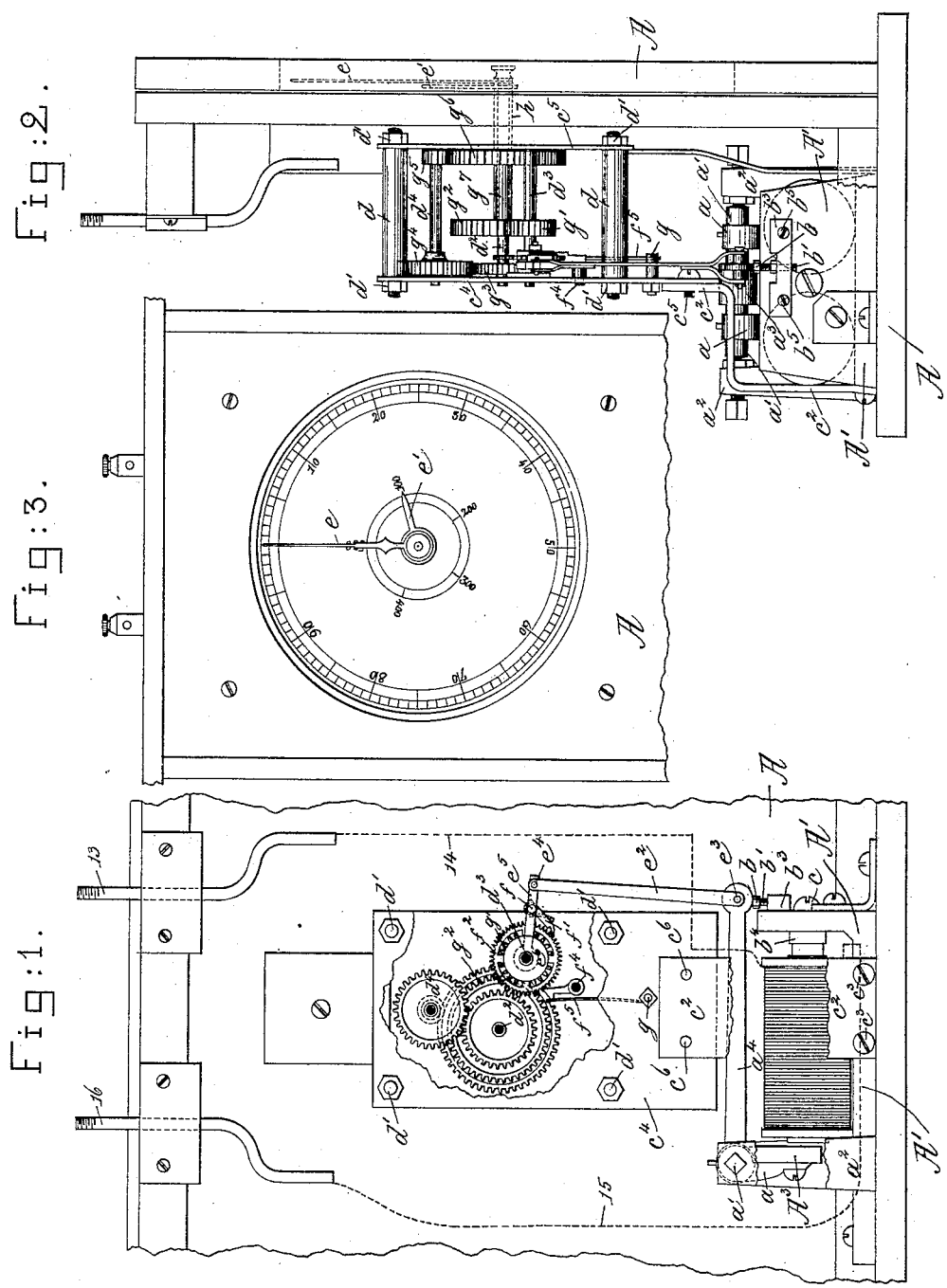

(No Model.) 2 Sheets—Sheet 2.
W. B. MASON, E. J. WESCOTT & W. L. STEVENS.
APPARATUS FOR INDICATING THE SPEED OF SHAFTING, MACHINERY, &c.
No. 334,960. Patented Jan. 26, 1886.
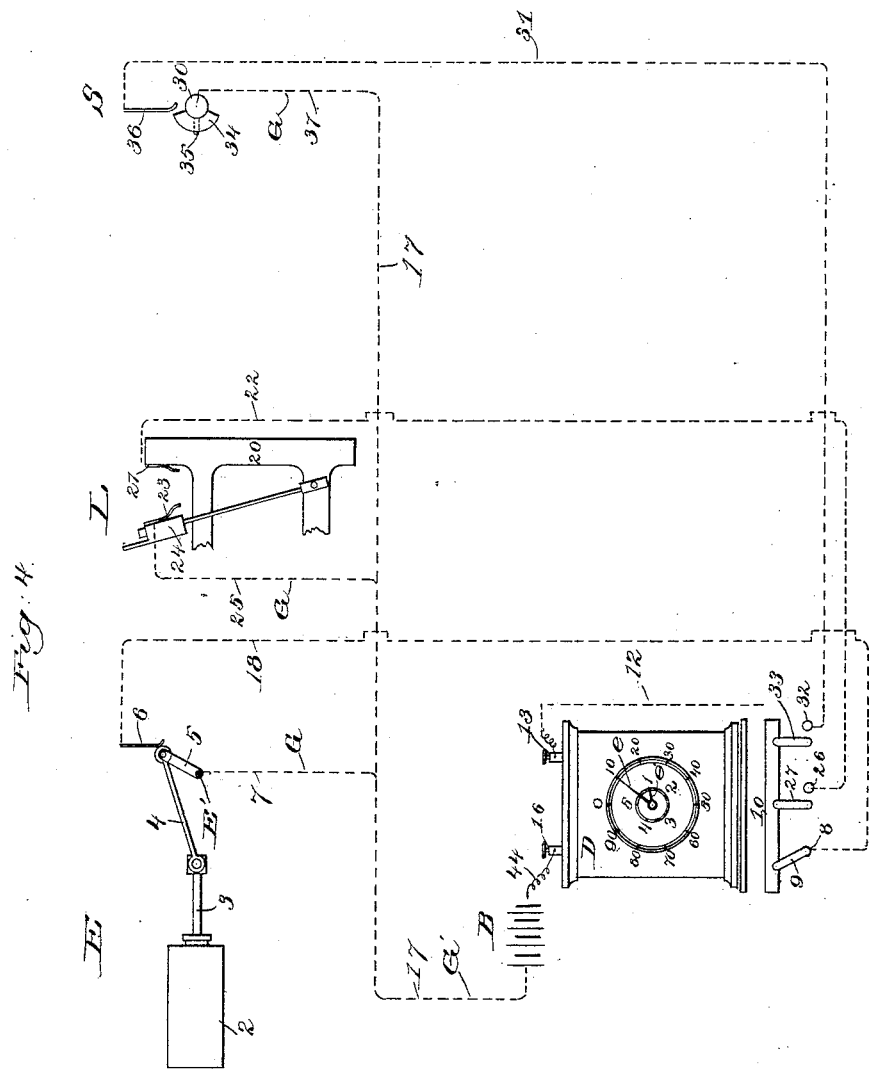

UNITED STATES PATENT OFFICE.

WILLIAM B. MASON, OF BOSTON, EDWIN J. WESCOTT, OF HYDE PARK, AND WILLIAM L. STEVENS, OF BOSTON, MASSACHUSETTS.

APPARATUS FOR INDICATING THE SPEED OF SHAFTING, MACHINERY, &c.

SPECIFICATION forming part of Letters Patent No. 334,960, dated January 26, 1886.

Application filed September 12, 1885. Serial No. 176,938. (No model.)

*To all whom it may concern:*

Be it known that we, WILLIAM B. MASON, of Boston, county of Suffolk, EDWIN J. WESCOTT, of Hyde Park, county of Norfolk, and WILLIAM L. STEVENS, of Boston, county of Suffolk, and State of Massachusetts, have invented an Improvement in Apparatus for Indicating Speed of Shafting, Machinery, &c., of which the following description, in connection with the accompanying drawings, is a specification, like letters on the drawings representing like parts.

This invention has for its object to enable the general rate of rotation of shafting or speed of movement of a machine at a distant station to be registered or indicated at a central office whenever desired, our invention, applied as a speed-indicating system, making it possible to immediately ascertain the speed of rotation of any particular shaft of a factory or mill, whether it be a main or counter shaft, and also to ascertain, as in the case of a loom, the number of rotations of its crank-shaft or the vibration of any part thereof, as the lay, or the number of reciprocations of any part of a machine—
as, for instance, the strokes of the needle-bar, the feeding-device, or the shuttle of a sewing-machine, or the reciprocations of a planer-table.

In cotton-factories it is very desirable to keep all the machinery in the different rooms running at a certain speed, which is established according to the quantity of goods to be made, thus enabling all the preparing machines and the looms to be run at the proper relative speed, so that all the different machines will properly supply, and yet not overrun those following. This rate of speed is now calculated by the speed of rotation of the main and counter shafts and by the diameters of the driving and driven pulleys, yet with the most careful calculation the speed of the moving parts is an uncertain factor, owing to the slipping of the driving-belts, which varies with the weather and by oil thereon, and for various other causes—such, for instance, as the stoppage of any part of the machinery being moved or by bad or irregular management of the engine.

By means of our apparatus it is possible at any moment, by the mere closing of a circuit, to start into operation an indicator or register which will indicate the speed of the shafting or machinery in the circuit so completed, in order that the superintendent may quickly know the said speed and correct irregularites, if existing, so as to keep the machinery in operation at the desired speed.

Our invention consists, essentially, in a method or system of registering or indicating at will at a central office the speed of rotation or other movment of moving bodies at a distance therefrom, whereby the speed of the running machinery at any part of a mill may be quickly ascertained and kept up to the established or desired rate of speed.

In accordance with our invention the moving device—a shaft or machine—the speed of which is to be registered or indicated, carries or moves one member of a circuit-closer, the other co-operating member thereof being arranged in such close proximity thereto as to enable a circuit to be closed at each rotation or reciprocation of the device carrying the movable member of the circuit-closer, the said movable and fixed circuit-closing members, placed at a distance from the office where the indicator or register is located, being in circuit by suitable wires with the said indicator or register and a proper battery, the completion whenever desired of any circuit, preferably at or near the indicator or register, by means of usual switches or push-buttons, enabling the speed of the moving shafting or machinery in that circuit to be readily ascertained.

The registering device or indicator herein shown consists of a train of gears rotated by a pawl pivoted upon a lever operated through the armature-lever of an electro-magnet, the said pawl engaging the teeth of a ratchet-wheel on the arbor of one of the said gears, revolving the said ratchet-wheel a distance of one tooth at each movement of the armature away from the poles of its magnet, such movement of the armature being caused by breaking the circuit at the shaft or machine whose speed is to be registered, the said gears acting to move hands corresponding to the minute and second hands of a watch over a graduated dial, the hand corresponding to the minute-hand moving the space of one graduation at each impulse of the magnet.

Figure 1 is a rear side view of a registering device or indicator employed by us, the case being broken out to show the magnet and other operating parts; Fig. 2, a side elevation of Fig. 1, the side, back, and top of the case being omitted; Fig. 3, a partial front view of Fig. 2, chiefly to show the dial and portions which are not clearly shown in the other figures; and Fig. 4 a diagram showing a registering device or indicator in circuit with different parts of a mill or factory, the letters E L S indicating stations or rooms containing different apparatus the speed of which is to be taken when desired.

Referring first to Figs. 1 to 3, the case A, of wood or other usual material, has secured to its bottom an iron frame or bed, A', supporting an electro-magnet, $A^2$, having its armature $A^3$ secured to arms $a$ of a shaft, $a'$, having bearings on pointed screws in uprights $a^2\ a^2$, the shaft $a'$ having secured to it the hub $a^3$ of the armature lever $a^4$. The armature-lever $a^4$, extended longitudinally over the magnet $A^2$, is herein shown as having for its back-stop the screw-head $b$ of the screw $b'$, fastened to the metal piece $b^3$, attached to the frame A' by the screws $b^5$, the said frame also supporting the heel-piece $b^4$ of the magnet, the heel-piece being attached by the screw $c$. The clock mechanism is supported above the electro-magnet by a bent piece of metal or bracket, $c^2$, secured at one end to the frame or bed A' by screws $c^3$, and at its other end to the plate $c^4$ by screws $c^6$, the plate $c^4$ being secured to a plate, $c^5$, by posts $d$, provided with nuts $d'$. The plates referred to form bearings for the arbors $d^2\ d^3\ d^4$, supporting the train of gears for rotating the hands $e\ e'$ when operated by the electro-magnet in a manner to be described. A link, $e^2$, pivoted to the armature-lever at $e^3$, is also pivoted at $e^4$ to a lever, $e^5$, which, at its other end, encircles the arbor $d^3$, the lever $e^5$ having pivoted to it at $f$ a push-pawl, $f'$, (see Fig. 1,) which engages a tooth of a ratchet-wheel, $f^2$, connected with the arbor $d^3$, thereby rotating the said arbor one step each time the magnet $A^2$ is demagnetized by breaking the circuit of the magnet at the machine whose speed is to be recorded, as will be hereinafter described, the movement of the armature away from the poles of its magnet causing the push-pawl $f'$ to engage a tooth of the ratchet-wheel $f^2$ and rotate the arbor $d^3$. The spring-held detent $f^4$ prevents the reverse rotation of the wheel $f^2$ and arbor $d^3$. The shaft $d^3$ has fast upon it a gear, $g'$, which engages a gear, $g^2$, fast on the shaft $d^2$, to which is attached the hand $e$, each movement of the ratchet-wheel actuating the said hand one step. The shaft $d^2$ has fast upon it a toothed wheel, $g^3$, which engages a toothed wheel, $g^4$, fast on a shaft, $d^4$, provided with a pinion, $g^5$, that engages a toothed gear, $g^6$, secured to a sleeve, $g^7$, loose on the shaft $d^2$, the front end of the said sleeve having attached to it the short hand $e'$. One complete revolution of the shaft $d^2$ and its pointer $e$ through the gearing described effects one-fifth of a rotation of the sleeve $g^7$ and its pointer $e'$.

The operation of our improved registering or indicating device can be readily understood by reference to Fig. 4, which shows the manner of connecting the said apparatus with machinery the speed of which is to be registered or indicated.

At station E, Fig. 4, 2 represents the cylinder of an engine, 3 its piston-rod, 4 the link, and 5 the crank on the main shaft E' of the engine. The shaft has electrically joined to it the wire 7, the other end of which is secured to a wire, 17, leading to one pole of the battery B, a wire, 44, connecting the other pole with the binding-post 16 of the registering device. An insulated spring, 6, secured to a fixed part of the engine in any convenient position, is connected by wire 18 with the knob 8 of a switch, the lever 9 of which is fastened to a metal bar, 10, connected by wire 12 with the binding-post 13, joined to one of the magnet-wires 14, the other wire, 15, of which is connected to the binding-post 16. The spring 6, being struck or acted upon by a part of the crank 5 at each stroke of the piston, closes the circuit of the engine (indicated by 17 7 18 12 44) at each stroke of the said piston, magnetizing the electro-magnet $A^2$, which attracts its armature $A^3$, placing the push-pawl $f'$ into position to engage a tooth of the ratchet-wheel $f^2$, which it does when the electro-magnet is demagnetized by breaking the circuit on the reverse stroke of the piston, thereby rotating the hands $e\ e'$, the hand $e$ moving one step for each stroke of the piston.

If it is desired to ascertain the speed of a loom, the usual crank-shaft may have combined with it appliances such as described with relation to the crank of the engine; or, as in station L, showing part of a loom, the frame 20 is shown as provided with an insulated contact-spring, 21, forming one member of a circuit-closer, which is electrically connected by wire 22 with the knob 26, co-operating with the switch-lever 27, joined to the bar 10, electrically connected to the battery, as described, a spring, 23, co-operating with the spring 21, and forming the other member of the circuit-closer, being connected by wire 25 to the battery-wire 17, the circuit for the said loom being traced by 17 25 22 12 44.

Referring to station S, we have shown a shaft the number of rotations of which it is desired to know. The shaft 30 therein represented is electrically connected by wire 37 to the battery-wire 17, the said shaft having an insulating-block, 34, secured to it by a screw, 35, the latter forming one member of a circuit-closer, co-operating with the insulated spring 36, forming the other member of the said circuit-closer, and attached to the machine in any convenient position, the said spring being electrically connected by wire 31 with the knob 32 of a switch, the lever 33 of which is joined to the rod 10, the circuit of the shaft being represented by 17 37 31 12 44.

The superintendent, desirous of knowing the speed of shafting or machinery in any particular station or room, switches the machine desired into circuit, the said machine being represented in Fig. 4 as the engine, and by means of a watch or other time-piece notes the number of graduations the hand $e$ makes in a given time.

Instead of the wires 7 25 37 being connected to the battery-wire 17, they may be grounded, as at G G, a corresponding ground being made at G' on the wire 17, and instead of the metal bar 10 and switches 9 8 the usual push-buttons may be used.

Instead of the particular register herein shown, we may employ any other well-known registering or recording mechanism capable of operating in the manner and for the purpose specified.

We claim—

In a system for registering the speed of shafting or machinery, a central office, two or more electric circuits centering therein, circuit-controlling devices in each of the said circuits and located at or near and operated by the said shafting or machinery, combined with a registering device and with circuit-controllers, one in each circuit, located in the said central office, said registering device being connected to one member of each of said circuit-controllers, whereby the said registering device may be placed in any one of the said circuits, to operate substantially as described.

In testimony whereof we have signed our names to this specification in the presence of two subscribing witnesses.

WM. B. MASON.
   EDWIN J. WESCOTT.
   WM. L. STEVENS.

Witnesses:
 G. W. GREGORY,
 J. H. CHURCHILL.